Patented Mar. 16, 1926.

1,577,188

UNITED STATES PATENT OFFICE.

WALTER A. PATRICK, OF MOUNT WASHINGTON, MARYLAND, ASSIGNOR TO THE SILICA GEL CORPORATION, OF BALTIMORE, MARYLAND, A CORPORATION OF MARYLAND.

METHOD OF PREPARING CATALYTIC AGENTS.

No Drawing. Application filed November 18, 1922. Serial No. 601,867.

*To all whom it may concern:*

Be it known that I, WALTER A. PATRICK, a citizen of the United States, and residing at Mount Washington, Baltimore County, State of Maryland, have invented certain new and useful Improvements in Methods of Preparing Catalytic Agents, of which the following is a specification.

The present invention relates to methods of preparing catalytic agents comprising active material or catalysts proper associated with carriers. This application is a continuation in part of my application, Serial No. 467,311, filed May 6, 1921.

The present method gives a catalytic mass which is particularly suitable for gaseous reactions although it is not limited to such uses, as it may be applied to other catalytic reactions. It may be used in lump or granular form or in a more subdivided condition, as may be found desirable.

Frequently, and especially when the active material is costly, as when platinum is used, it is desirable to prepare the catalytic mass in such a way that the maximum amount of the active material used shall be equally available and capable of functioning to its maximum efficiency. It is one of the objects of the present invention to attain this result. The active material after being associated with the carrier is in such physical condition that it presents an unusually large surface per unit of weight, and the entire amount thereof is deposited on the surface of the pores at or very near the external surface of the carrier, so that all of the active material is effective on the reacting substances, when the latter are passed through the catalytic bed or otherwise brought into contact with the catalyst.

The foregoing and other objects are accomplished by using a carrier which possesses the necessary physical structure; and also following the method described herein of depositing the active material thereon.

The material employed as carrier according to the present invention must have a large number of ultra-microscopic pores. They are so small that it is difficult to give a satisfactory measure of their size. However, for all practical purposes, the amount of water present in the porous carrier when it is in equilibrium with water vapor under given conditions of temperature and partial pressure will give a measure of the size of the pores, since the amount of water present in the carrier is a function of the size of the pores. The smaller the pores, the lower the vapor pressure at which the porous carrier will hold large amounts of water. Thus silica gel, which is preferred for the present invention, has a sufficient number of small pores so that it will hold at least 21% of its own weight of water at 30° C., when in equilibrium with water vapor at a partial pressure of substantially 22 mm. of mercury. Kieselguhr and boneblack for example will have practically no water under these conditions. It follows therefore that kieselguhr and boneblack have practically no pores as small as the greater part of the pores in silica gel. On the other hand highly activated charcoal contains more water than silica gel under these conditions, which indicates that it has more small pores than silica gel.

Many products that are improperly termed gels do not have the structure to absorb at these low partial pressures. Thus, the product obtained by precipitating silicic acid by mixing sodium silicate and an acid and drying the precipitate, does not have the finely porous structure required. It is porous but the pores are not small enough. On the other hand, silica gel such as obtained as the product of the method disclosed in my Patent 1,297,724 has the required structure.

The physical structure of the carrier is of importance because it is one of the factors which determine the extent of subdivision of the catalyst deposited thereon and also the extent to which the entire quantity of catalyst used is able to function at its maximum efficiency. I have discovered that silica gel, having the pore size defined above after being impregnated with a catalytic material produces a catalyst many times as efficient per unit weight of active material as the ones now employed.

In my application Serial No. 362,138, filed February 28, 1920, I have disclosed and claimed methods of preparing catalyzers of the type mentioned above. The product as a new composition is claimed in application Serial No. 715,727, a division of said application Serial No. 362,138. In my application Serial No. 466,998, filed May 5, 1921, I have disclosed and claimed another method of preparing such catalyzers. The methods covered by the said application, 362,168, consists in the preparation of the catalytic gel by combining with materials from which the gel is obtained, a substance or substances which will produce or give the catalytic material in intimate association with the gel; while the method set forth in application 466,998, consists in preparing the catalyzer by treating the gel in substantially its final state of manufacture.

The present invention relates to methods of this latter class, according to which the catalytic material is applied in colloidal form to the gel itself, and the resulting substance heated to expel the liquid associated with the colloid. Since a colloidal solution is employed in which the active material or the material which is to become active, and which is generally a metal or a metal oxide, is already in highly dispersed condition, the active material after deposition on the carrier, is in extremely finely divided condition.

Any suitable active material may be used, some examples of which are the metals, copper, silver, gold, iridium, osmium, palladium, platinum, etc., the oxides of copper, iron, aluminum, zinc, cobalt, nickel, etc. Many others might be mentioned, in fact my invention covers broadly the method of applying a colloid to a gel carrier in the preparation of catalysts.

Methods of preparing colloidal solutions of metals and of metal oxides, are well known, as is shown by Svedberg's Herstellung Kolloider Loesungen (anorganische Stoffe) published by Theodor Steinkopff, Dresden, which is devoted to general and specific methods of preparing colloidal solutions, such as of the metal themselves, or their oxides, etc.

When a gel such as silica gel, the pores of which are already filled or substantially filled with water is brought into contact with a colloidal solution of a metal or metal oxide in water so that the entire surface is wet with the solution, the colloidal particles will tend to diffuse slowly into the water within the gel pores. The depth to which the colloidal particles will penetrate will depend upon the time allowed for diffusion and upon the size and mass of the colloidal particles. Even though the colloidal particles are small in comparison with the size of the pores so that they may readily pass into the same, the velocity of diffusion will be so small that in any reasonable time they will penetrate into the pores of the gel only to a slight extent. If, however, as is the case with many colloidal solutions, the particles are comparable in size with the diameters of the pores, they will be held in the pores at or very near the exterior surface, and in the finished catalytic mass practically all the active material employed will be equally available for catalytic action and readily accessible to the reacting substances.

In practicing the invention, as a rule a gel is employed having pores of the size defined above, which has either been incompletely dried or after drying to about 3 to 12% water content has been allowed to take up water vapor until the pores are filled or nearly filled with water. In the case of silica gel having the pore size as defined herein this means a total water content of about 30% to 40%. The gel is then brought in contact with a solution containing a catalyst in colloidal form, generally in water, and allowed to stay in contact for a suitable time, usually only a few minutes, whereupon the excess solution is drawn off and the residue of gel with its adhering catalyst is heated to reduce the water content. Should the colloidal solution employed contain other substances than the colloid and which may be undesirable and non-volatile, the gel mass after treatment with the colloidal solution may be washed with a solvent, generally water, before drying, or it may be washed thereafter.

The object of filling the pores of the gel with water before treating it with the colloidal solution is two-fold. In the first place, if the gel is not already approximately saturated with water, the rapid adsorption thereof which will take place on contact with the solution will cause the gel granules to shatter into small fragments, which generally is undesirable but not always so. It should be noted in this case that no essential change takes place in the gel structure other than the reduction in the size of the granules.

Secondly, if the gel be not first saturated with water there will be a greater penetration of the catalytic material thereinto, particularly if the colloidal particles are relatively small, and that part of the active material which has penetrated to any appreciable depth within the granules will have less chance of contact with the reagents and will therefore be less efficient than material which is at or near the surface, whereby the efficiency of the material as a whole will be lessened. This is a matter of great importance with expensive catalysts. On the other hand, if the gel is saturated with water before contact with the colloidal solution, the colloid can get into the gel only by the slow process of diffusion and consequently the penetration into the interior will be very slight.

It will thus be apparent that the use of a saturated, or almost saturated, gel, has certain important advantages, but where such advantages are not essential, an unsaturated or fairly dry, or even a dry gel may be used.

As one example of the application of my invention I will cite the preparation of platinized silica gel for use as a catalyst for the conversion of sulphur dioxide to sulphur trioxide.

A colloidal solution of platinum is prepared by the well known process of reducing chlorplatinic acid dissolved in water, by means of formaldehyde. The platinum content of the solution may be 0.314 grams per litre. This colloidal solution is poured over silica gel saturated as described above, in the proportion of 6.3 cc. of solution (containing 0.002 grams of platinum) to 20 grams of dry gel, the mixture being stirred to secure uniform distribution of the solution over the gel, and the whole heated for thirty minutes on a water bath. The resulting mass appears physically dry although it probably contains 12 to 15% of moisture; and it contains less than 0.002 grams or 0.01% of platinum, since some of the platinum used is lost. To illustrate the efficiency of this catalyst, when a 7% mixture of sulphur dioxide and air is passed over 20 grams of the catalyst at the rate of 300 cc. per minute 90% more or less conversion to $SO_3$ is obtained.

The activity of the mass per unit weight of platinum is many times as great as the activity of catalytic masses heretofore used. This great activity seems to be due to the fact that when the platinum is deposited from a colloidal solution of the metal upon a carrier which possesses a physical structure such as that of silica gel, it is not only all deposited where it is most effective, but the deposit itself appears to possess as a solid, a degree of dispersion comparable to the colloidal state, and it accordingly has the highest degree of activity as a catalyst.

Platinum impregnated silica gel has been cited as one application of this invention but it is to be understood that the invention is not limited thereto. Any gel having the structure previously defined may be employed and may be impregnated as described with any metal or metal oxide or with two or more of the same, or with other material capable of forming a colloidal solution and capable thereafter of acting as, or of being transformed into, catalytic material.

Nor is the invention limited in the use of the platinized gel to the particular reaction cited namely, to the conversion of sulphur dioxide to sulphur trioxide; but it, as well as other catalysts prepared according to this process, are applicable to a large number of other reactions.

The time of contact of the gel with the colloidal solution used, which is necessary or suitable to give the best results, is of course, variable and depends upon the size and mass of the colloidal particles, the rate of diffusion of the same, and the depth of penetration desired. The conditions of heating the impregnated gel to complete the drying process may be the same as are set forth in my Patent 1,297,724 for drying the silica gel itself except in so far as modifications may be desirable for the purpose of volatilizing or otherwise removing foreign substances which may have been present in the colloidal solution used.

The platinum impregnated substance is claimed in application Serial No. 466,998.

Having thus described the invention what is claimed as new and desired to be secured by Letters Patent is:

1. The process of preparing a catlytic agent, consisting in treating a porous gel having pores of such a size that the water content at 30° C. when in equilibrium with water vapor at a partial pressure of substantially 22 mm. of mercury will be at least 21% of the weight of the gel, the pores of which at the time of treatment are substantially filled with water, with a colloidal solution of catalytic material, and removing the water.

2. The process of preparing a catalytic agent, consisting in treating a porous gel having pores of such a size that the water content at 30° C. when in equilibrium with water vapor at a partial pressure of substantially 22 mm. of mercury will be at least 21% of the weight of the gel the pores of which at the time of treatment are substantially filled with water, with a colloidal solution of catalytic material, and evaporating the water.

3. The process of preparing a catalytic agent, consisting in treating a porous silica gel having pores of such a size that the water content at 30° C. when in equilibrium with water vapor at a partial pressure of substantially 22 mm. of mercury will be at least 21% of the weight of the gel the pores of which at the time of treatment are substantially filled with water, with a colloidal solution of catalytic material, and removing the water.

4. The process of preparing a catalytic agent, consisting in treating a porous silica gel having pores of such a size that the water content at 30° C. when in equilibrium with water vapor at a partial pressure of substantially 22 mm. of mercury will be at least 21% of the weight of the gel, the pores of which at the time of treatment are substantially filled with water, with a colloidal solution of catalytic material, and heating to evaporate the water.

5. A catalytic agent comprising porous gel having pores of such a size that the water content at 30° C. when in equilibrium with water vapor at a partial pressure of substantially 22 mm. of mercury will be at least 21% of the weight of the gel carrying a catalytic substance on the surface only of the pores at and immediately adjacent the external surface of the gel particles.

6. A catalytic agent comprising porous silica gel having pores of such a size that the water content at 30° C. when in equilibrium with water vapor at a partial pressure of substantially 22 mm. of mercury will be at least 21% of the weight of the gel, carrying a catalytic material on the surface only of the pores at and immediately adjacent the external surface of gel particles.

In testimony whereof I hereunto affix my signature.

WALTER A. PATRICK.